July 12, 1927.

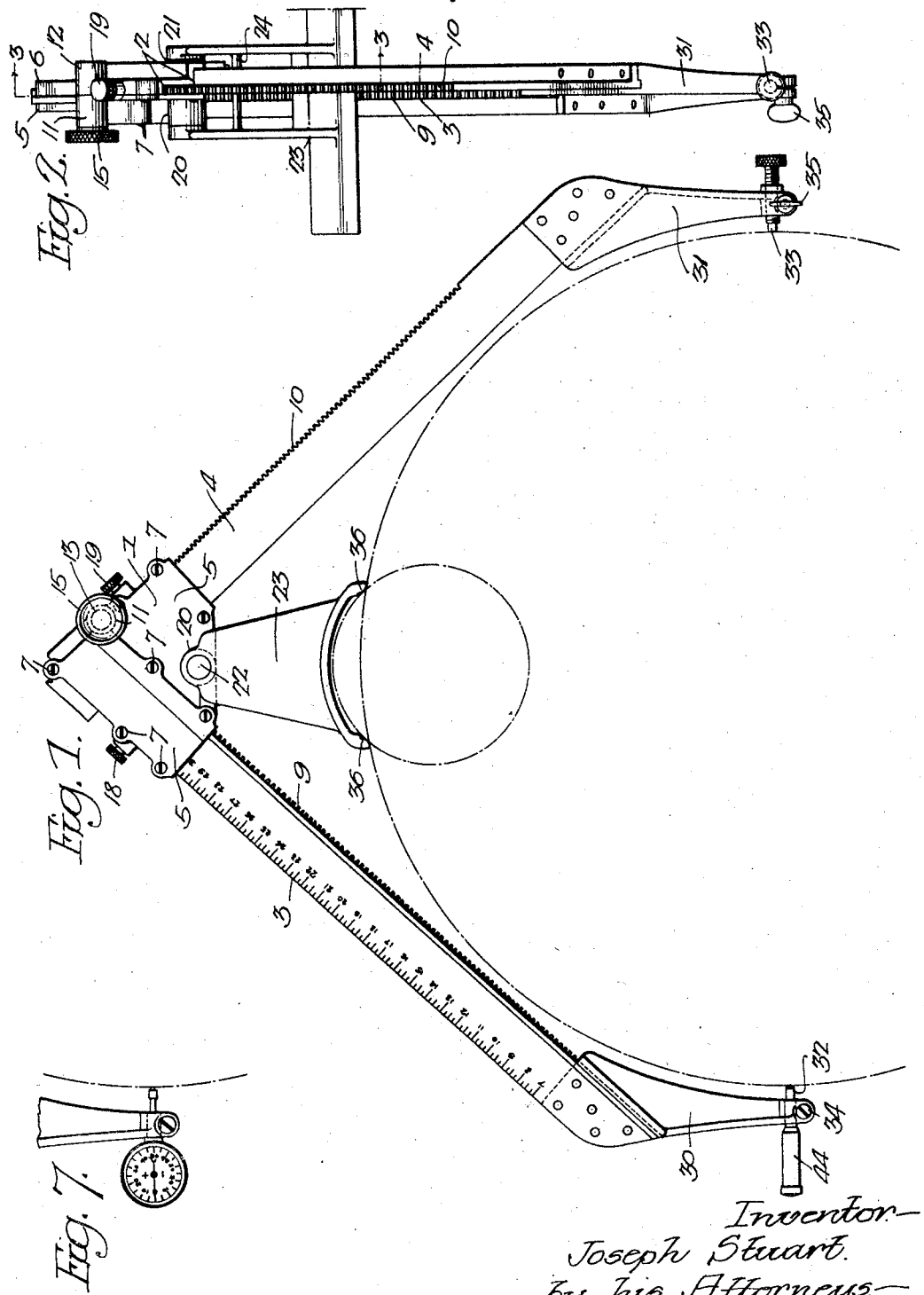

J. STUART

CALIPERS

Filed Sept. 17, 1924

Inventor- Joseph Stuart,
by his Attorneys.

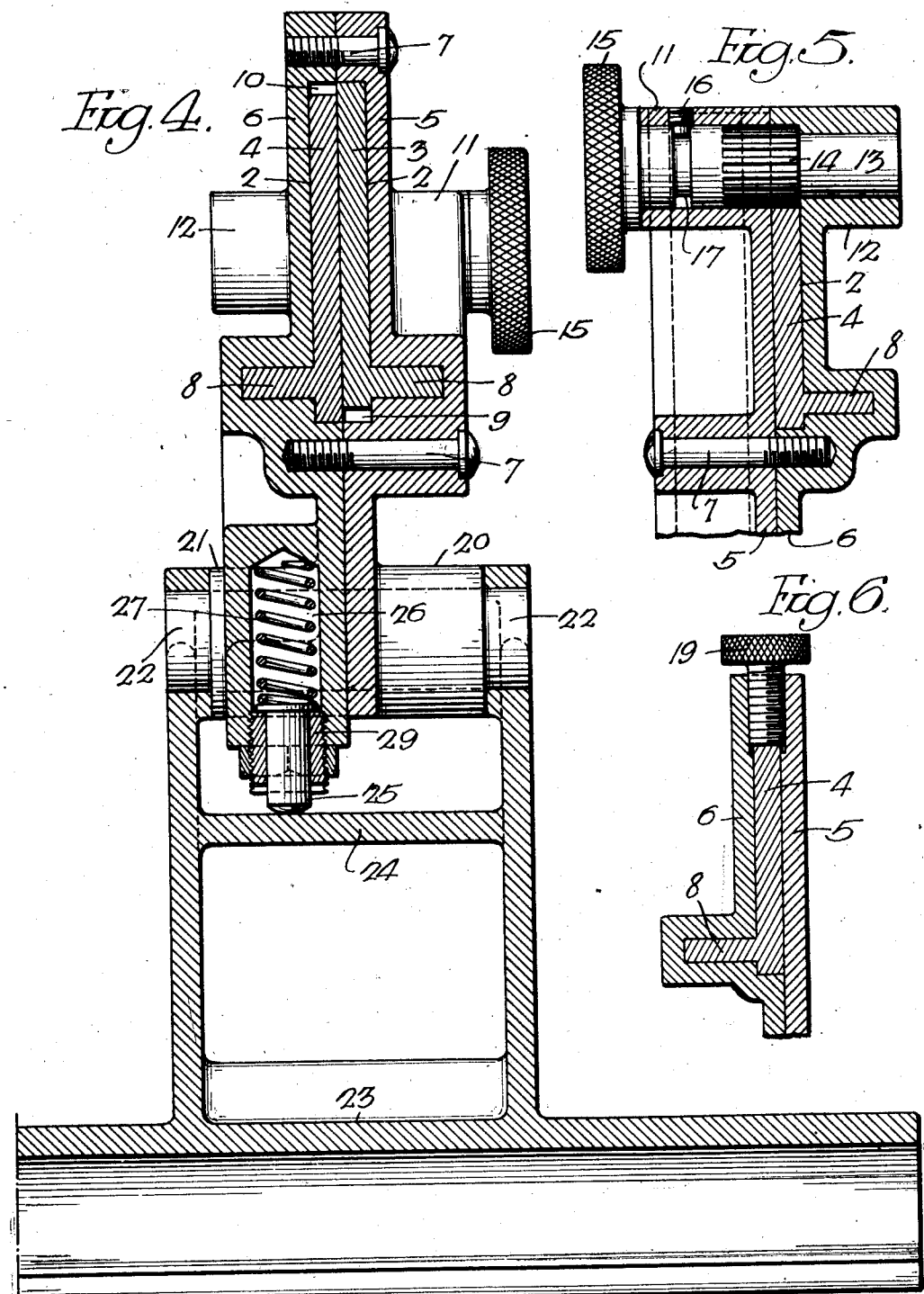

Patented July 12, 1927.

1,635,908

UNITED STATES PATENT OFFICE.

JOSEPH STUART, OF WILMINGTON, DELAWARE, ASSIGNOR TO LOBDELL CAR WHEEL COMPANY, OF WILMINGTON, DELAWARE, A CORPORATION OF DELAWARE.

CALIPERS.

Application filed September 17, 1924. Serial No. 738,171.

This invention relates to calipers, and more particularly to calipers adapted for use in gaging rolls and the like.

One of the objects of the invention is to provide a caliper of this type so constructed as to be adjustable for rolls of different diameters, and to increase the range of usefulness beyond those of other devices commonly employed for the same purpose.

The invention also resides in the novel details of construction which provides for the simultaneous equal adjustment of both arms of the caliper.

The invention further resides in a novel arrangement of parts which insures a true contact between the caliper and the sides of the roll which it is desired to gage.

In the attached drawings:

Figure 1 is a front elevation of the caliper illustrating the manner in which it is used to gage a roll;

Fig. 2 is a side elevation of the caliper;

Fig. 4 is an enlarged section on the line 4—4, Fig. 3;

Fig. 5 is an enlarged section on the line 5—5, Fig. 3;

Fig. 6 is an enlarged section on the line 6—6, Fig. 3, and

Fig. 7 is a fragmentary view illustrating a modification of the micrometer.

Figure 3:
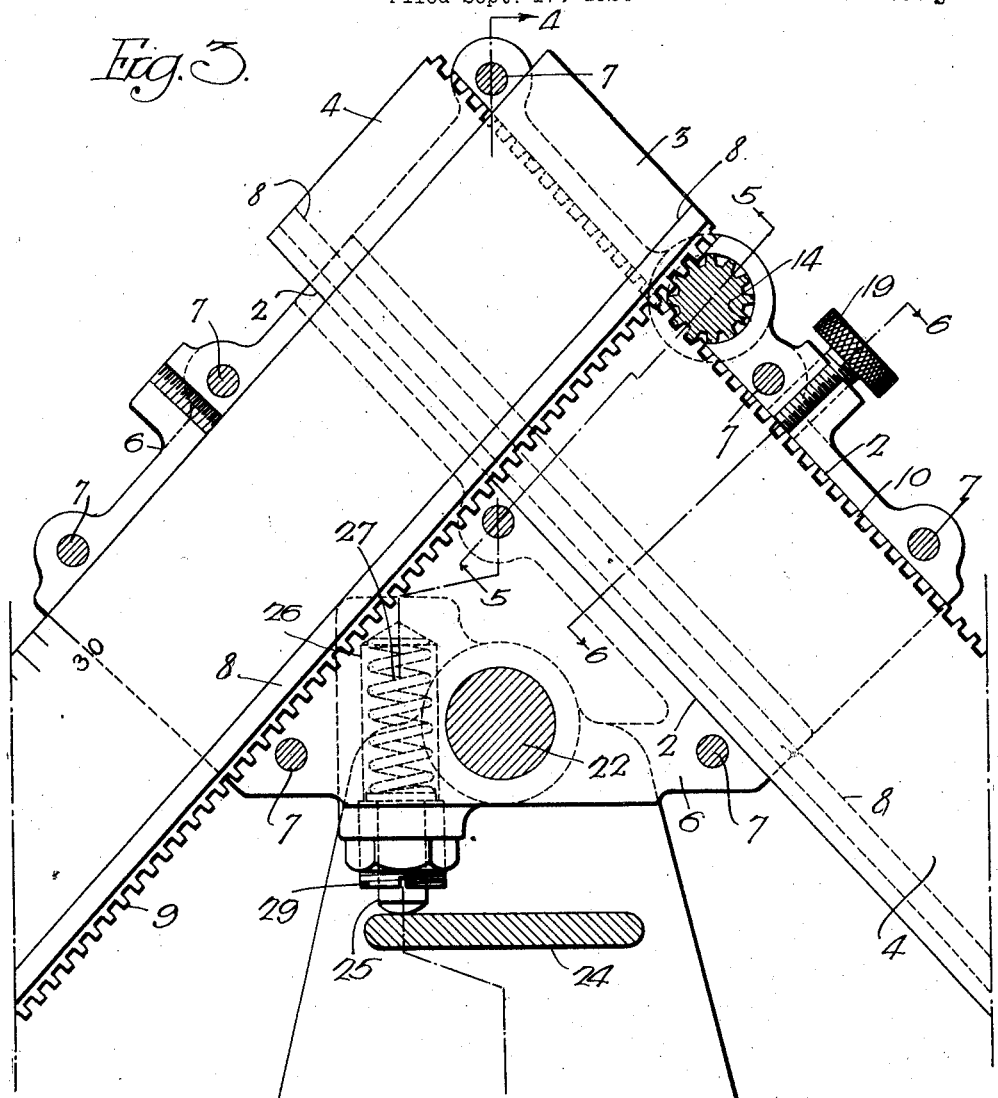
Fig. 3 is an enlarged fragmentary section on the line 3—3, Fig. 2.

With reference to the drawings, and particularly to Figs. 1 to 6, inclusive, the caliper comprises a substantially triangular body portion 1 having laterally offset guide channels 2, 2, for caliper arms 3 and 4. In the present instance, the body 1 consists of two plates 5 and 6 secured together by screws 7, 7, and so recessed on the inside as to form the aforesaid channels 2, 2, for the arms 3 and 4. Each of these arms, as shown in Fig. 4, comprises a longitudinal laterally projecting flange 8, and whereas the arm 3 is provided at its lower edge with a rack 9, the arm 4 has a similar rack 10 formed along its upper edge.

The plates 5 and 6 are provided with oppositely arranged bosses, 11 and 12, respectively, in which is journaled a shaft 13 which carries a pinion 14 and which carries also on that end which projects beyond the boss 11 a knurled head 15 by means of which the shaft 13 may be manually rotated. The shaft 13 is held in place in the said journals by means of a set screw 16, see Fig. 5, which is threaded into the boss 11 and projects into an annular recess 17 in the said shaft, this providing for rotation of the shaft but preventing movement thereof axially in the body. As shown in Fig. 3, the pinion 14 is so located that it coacts with the racks 9 and 10, and it will be obvious that rotation of the shaft 13 will cause the arms 3 and 4 to move longitudinally and simultaneously in the channels 2, 2, in the same relative direction and to the same extent. For the purpose of securing the arms in any one of their adjusted positions, set screws 18 and 19 are provided in the body 1 which may be forced down against the upper edges of the said arms 3 and 4.

Each of the plates 5 and 6 is also provided at its lower end with a boss 20 and 21 respectively, which are oppositely arranged and constitute together a journal for a shaft 22, which shaft projects beyond the journals at each end; and from these projecting ends is suspended a saddle 23 adapted to seat against the surface of a roll or like body which it may be desired to gage, as shown in Figs. 1 and 3, and thereby to constitute a support for the body 1 and for the arms 3 and 4.

The saddle 23 comprises in the present instance a cross bar 24, against the upper face of which is adapted to bear a plunger 25 slidable in a recess 26 in the plate 6, as shown in Fig. 4, and normally retained in the bottom of said recess by means of a spring 27. As shown in Fig. 4, the plunger 25 has at its upper end a flange 28 which retains the plunger in a threaded sleeve 29 which constitutes its bearing, the sleeve 29 being threaded into the lower end of the recess 26, as clearly shown, and providing for the removal of the plunger for replacement, if such should be necessary, and for release also of the spring 27.

The outer end of each of the arms 3 and 4 is provided with an extension 30 and 31 respectively, these extensions carrying at their lower ends contact elements 32 and 33 which in operation are adapted to engage the surface of the roll, as illustrated in Fig. 1. Each of these contact elements is clamped in place in the parts 30 and 31 by means in present instance of clamping screws 34 and 35, and in the present instance, also, the element 33 is in the form of a screw whereby this may be adjusted as desired.

In using this device, the arms 3 and 4 are set astraddle of the roll or other object which is to be gaged, as clearly illustrated, and it will be noted that the saddle on the bottom is provided with two parallel contacting edges 36, 36, which extend at right angles to the planes of the arms 3 and 4, and which naturally assume, when brought into contact with the roll, positions parallel to the longitudinal axis of the latter. After the saddle 23 engages the side of the roll, the arms 3 and 4 are adjusted by means of the shaft 13, and as previously described, until the contact elements 32 and 33 are in alignment with the true diameter of the roll, final adjustment of the contact points into engagement with the surface of the roll being accomplished by adjustment of the screw 33. This adjustment of the instrument is maintained by tightening the various set screws 18, 19 and 35, and the instrument may then be moved axially along the roll to thereby determine whether the roll is of uniform size or uniform diameter throughout. Also by moving the instrument around the roll, it is possible to determine whether or not the roll is a true cylinder.

Where a true reading of the diameter or size is required, one or both of the arms may be scaled, as shown in Fig. 1, and one or other of the contact elements, such as 32, may take the form of a micrometer for the final fine adjustment and reading. In lieu of the micrometer of the usual form, an indicating device such as shown in Fig. 7 may be employed, which affords the desired reading without necessity for manual adjustment.

The function of the plunger 25 will be apparent to those acquainted with the art, this plunger by reason of the spring 27 acting to give the body 1 and the arms 3 and 4 a bias which maintains one of the contact elements, in the present instance the element 33, in firm contact with the surface of the roll. The spring-pressed plunger 25 materially facilitates the adjustment of the device to the roll and insures accuracy in operation.

A material advantage of the device as described resides in its adaptability to rolls of a wide range of size. This will be clearly illustrated in Fig. 1, in which the maximum and minimum sizes are illustrated in broken lines. The device further is of simple form and easy to manufacture and to manipulate, both in the actual gaging operation and in the adjustments to any particular roll or other body.

The device is subject to modification without departure from the essential feature of the invention.

I claim:

1. Calipers comprising a body, arms adjustable in the body and relatively movable to vary the distance between the corresponding extremities, a support member pivotally secured to the body and adapted to assume an operative position between said arms, and resilient means tending to move said member on its pivot toward one of the arms.

2. Calipers comprising a supporting member adapted to rest against a body to be measured, a pair of relatively movable elements, and means for pivotally securing said elements to said member whereby when the member rests against said body the said elements are maintained in predetermined relative positions with respect to the body and at opposite sides of the supporting member.

3. Calipers comprising a member adapted to engage a body to be measured, a pair of relatively movable elements, means for pivotally securing said elements to said member, said elements being adapted to contact with said body at points on opposite sides thereof when said member engages the body, and a spring interposed between the member and said elements and tending to move said member around the pivot towards one of said elements.

4. Calipers comprising a body, a work-engaging member pivotally secured to said body, measuring elements adjustable in the body and projecting on opposite sides of said member, means for rigidly securing said arms in the body, and a spring engaging both the body and the said member and tending to shift said member towards one of said measuring elments.

5. Calipers comprising a body, work embracing arms adjustable in said body, a work-engaging member pivotally secured to the body intermediate the arms, and a spring carried by the body at one side of the pivot and adapted to exert a pressure on the work-engaging member tending to move the latter on its pivot towards one of said arms.

6. Calipers comprising a body, work-embracing arms adjustable in said body, a work-engaging member pivotally secured to said body intermediate the arms, and means for relatively moving said arms to vary the distance between said work-embracing parts.

7. Calipers comprising a body member, work-embracing arms adjustable in said body to vary the distance between the work-embracing parts, and a work-engaging member pivotally secured to said body intermediate the arms and adapted when engaging the work to maintain the said arms in predetermined relative positions with respect to the work.

8. Calipers comprising a body, work-embracing arms adjustable in said body to vary the distance between the work-embracing parts, and a work-engaging member pivotally secured to the body between said arms and comprising spaced parallel edges extending at right angles to the plane of said arms.

JOSEPH STUART.